Patented Apr. 30, 1929.

1,711,482

UNITED STATES PATENT OFFICE.

HAROLD GROSSMAN, OF CALDWELL, NEW JERSEY.

METHOD OF SUBDIVIDING SOLID AND SEMISOLID SUBSTANCES.

No Drawing.   Application filed September 26, 1924.   Serial No. 740,140.

The invention relates to electrically conductive articles or articles having electrically conductive surfaces, and to the method of preparing the same.

In certain industries it is desirable to have plastic compositions embodying wax or resinous materials but which for certain reasons must be electrically conductive. An instance of this is the phonograph industry wherein a wax is used as the principal component of the records and sometimes of the matrices, molds, etc., and it is desirable to electroplate the article in the course of record manufacture, duplication, etc. The article must therefore be conductive or at least its surface must be.

Attempts have been made to prepare for this purpose mixtures of graphite and wax by stirring the graphite into melted wax or by grinding together the wax and graphite in desired proportions. These attempts have not been successful for the reason that the wax does not take on the conductive coating of graphite but, on the contrary, the particles of graphite become coated with an insulating coating of wax; and therefore the production of a homogeneous mixture has not been possible.

It is an object of my invention to provide a homogeneous composition or mixture of wax or the like and a divided conducting material, such as graphite, which composition is suitable for molding directly into the desired conductive articles or for producing conducting coatings on non-conducting articles.

Another object of the invention is to treat the wax preliminary to its incorporation with the divided conductive material so that it is amenable to the usual methods of mixing to produce a homogeneous conductive composition.

There are a number of substances, including many waxes, which are difficult to powder by attrition for the reason that during grinding action particles of the substance cohere and the substance does not disintegrate into the powdered state. Other substances when subjected to a grinding operation simply flatten out as would any material in plastic condition. Paraffin wax is an example of such a substance. Other substances cannot be reduced to powdered condition by attrition or grinding because of their explosive nature. Examples of such substances are picric acid, mixtures thereof with other materials such as nitronaphthalene, and mono nitro glycerol, as well as alpha-di- and tri-nitro glycerol.

I have discovered a simple method whereby waxes, resins and other substances of the character referred to and many other materials may be prepared in powdered or subdivided condition, and the size of the particles controlled; and further that the subdivided wax or resin may be incorporated with a divided conductive material, such as graphite, to produce a uniform, homogeneous body, by the ordinary mixing operations. This mixture may be molded according to known methods, and the resulting article will be electrically conductive; or, the conductive mixture may be applied as a coating or surface filling material to a non-conducting base, as will be understood in the art.

The first part of the method of the present invention has to do therefore with the preparation of the subdivided wax, resin, etc., and I shall now describe a preferred embodiment of that operation. The wax or resin etc. is melted and then added to hot water which may have dissolved therein a small proportion of an emulsifying agent such as sodium hydroxide or sodium oleate. The mixture is thoroughly agitated to emulsify the wax while still hot. This hot emulsion is thereupon introduced into cold water, whereupon the wax particles solidify in a fine state of subdivision. The resulting powder can be filtered off or otherwise separated from the liquid, washed, if necessary, and dried. Certain practical variations are possible and will be described later.

As a specific example of this part of the invention I shall recite in more detail a suitable method of procedure with proportions, but it is to be understood that I do not thereby intend to limit the scope of the invention to such details of procedure or proportions or to the specific materials employed except as may be defined in the appended claims.

100 c. c. of paraffin wax are heated until the wax is completely melted. This is added to 200 c. c. of boiling sodium oleate solution containing 2 percent by weight of sodium oleate. The mixture is thoroughly shaken to completely emulsify the wax and thereupon the emulsion is poured into cold water. The wax particles solidify in a fine state of subdivision which I have herein designated as powder. The particles when examined under the miscroscope will be found to be of fairly uniform size and in the main substantially spherical in shape.

Water alone without the addition of any dispersing agent may be employed in many instances if the emulsion is quickly precipitated for instance by pouring into cold water before it has time to break. Other liquid media, for example oils, may be used instead of water. Also, it is not necessary to quickly chill the emulsion to precipitate the wax, although this procedure is preferred; the emulsion may be allowed to simply cool under atmospheric conditions.

The size of the particles formed in the above method of "powdering" can be controlled in any of several different ways or by appropriate combinations thereof. Thus, if in the preceding example an electrolyte, such as hydrochloric acid or a salt, is added to the emulsion either before or after the latter is introduced into the cold water, the wax will solidify in larger particles. By variation of the proportion of the electrolyte employed, the size of the grains or particles may be determined. Also, since different electrolytes have varying activities in this respect, the size of the particles may be controlled by selection of the electrolyte. The size of the particles may be controlled in other ways, for example: (1) by varying the amount of emulsifying agent employed, (2) by varying the ratio of wax and water, and (3) by varying the intensity of the agitation.

The powdered wax may be mixed with powdered graphite or similar subdivided conductive material in any desired proportions and in any manner suitable for homogeneously mixing two subdivided solid substances. Or, in the case of wax and graphite, the latter in deflocculated or powdered form may be added to the wax emulsion and the two substances precipitated together.

The mixture may be pressed into a plate or other desired form or molded in any appropriate manner to produce the desired articles; and since the graphite is uniformly distributed through the mixture and on the surface of the wax particles, the article is electrically conductive and suitable for the purposes described.

Graphite has been mentioned specifically as the conductive material to be incorporated with the wax. It is to be understood that this has been done only by way of example and that other conductive substances including pulverized metal can be employed.

Also, while I have referred to paraffin wax, I wish it understood that other waxes, whether of animal, vegetable or mineral origin, are amenable to the method, as are also many resins, some of which because of their non-vitreous nature cannot be reduced to powdered condition by crushing or grinding. In fact the method of subdivision is not limited in its application to waxes and resins but is applicable to the subdivision of emulsifiable substances in general; and as to those substances which can be reduced by crushing or attrition methods, the present process yields particles of more uniform size.

In powdering picric acid and substances with similar properties, this can be done in a solution of the acid, heated under pressure to the point where the solid acid melts, and releasing the emulsion into cold water. Other materials having a melting point higher than 100° C. can be similarly treated by keeping the water under pressure. Soluble materials can be melted in a saturated solution of the material. No more of it will dissolve and it will melt when heated.

By the terms "powdered", "subdivided", etc., as employed herein it will be understood that any condition of minute subdivision is intended, without reference to the form or finite measurements of the particles.

In the foregoing description and in the appended claims the word "precipitate" is used to designate the conversion of the emulsified material or the disperse phase of the emulsion into the solid or semi-solid colloidal and filterable condition.

I claim:—

1. The method of subdividing solid and semi-solid substances which comprises, forming an emulsion of the substance in a liquid medium, precipitating the emulsified substance in the form of fine particles, and separating the precipitated substance from the liquid medium.

2. The method of subdividing solid and semi-solid substances which comprises, forming a hot emulsion of the substance in the liquid medium, precipitating the emulsified substance in the form of fine particles by chilling, and separating the precipitated substance from the liquid medium.

3. The method of subdividing solid and semi-solid substances which comprises, forming an emulsion of the substance in an aqueous medium, precipitating the emulsified substance in the form of fine particles by mixing it with an aqueous liquid, and separating the precipitated substance from the aqueous medium.

4. The method of subdividing solid and semi-solid substances which comprises, forming a hot emulsion of the substance in an aqueous medium, and precipitating the emulsified substance in the form of fine particles by mixing the hot emulsion with a cold aqueous liquid.

5. The method of subdividing solid and semi-solid substances which comprises, forming an emulsion thereof in a liquid comprising an emulsifying agent, precipitating the emulsified substances in the form of fine particles, and separating the precipitated substance from the liquid.

6. The method of subdividing solid and semi-solid substances which comprises, forming an emulsion thereof in an aqueous liquid containing sodium oleate, precipitating the emulsified substance in the form of fine particles, and separating the precipitated substance from the aqueous liquid.

7. The method of subdividing solid and semi-solid substances which comprises, forming an emulsion thereof in a hot aqueous liquid containing sodium oleate, and precipitating the emulsified substance by mixing the hot emulsion with a cold aqueous liquid.

8. The method of subdividing solid and semi-solid substances which comprises, forming an emulsion thereof in a hot aqueous liquid containing about two percent of sodium oleate, and precipitating the mulsified material by mixing the emulsion with cold water.

9. The method of subdividing solid and semi-solid substances which comprises, forming an emulsion of the substance in a liquid medium, precipitating the emulsified substance in the form of fine particles, and controlling the size of the particles precipitated.

10. The method of subdividing solid and semi-solid substances which comprises, forming an emulsion of the substance in a liquid medium, precipitating the emulsified substance in the form of fine particles, and controlling the size of the particles precipitated by the addition of an electrolyte to the emulsion.

11. The method of subdividing waxes which comprises, melting the wax, forming a hot emulsion thereof in an aqueous liquid, adding an electrolyte to the emulsion, and precipitating the emulsified wax in the form of fine particles.

12. The method of subdividing waxes which comprises, melting the wax, forming a hot emulsion thereof in an aqueous liquid, adding an electrolyte to the emulsion, and precipitating the emulsified wax by mixing the hot emulsion with cold aqueous liquid.

13. The method of subdividing waxes which comprises, melting the wax, forming a hot emulsion thereof in an aqueous liquid, adding hydrochloric acid to the emulsion, and precipitating the emulsified wax.

14. The method of subdividing paraffin wax which comprises, melting the wax, forming a hot emulsion thereof in an aqueous liquid containing an emulsifying agent, and precipitating the emulsified wax by mixing the emulsion with an aqueous liquid.

15. The method of subdividing paraffin wax which comprises, melting the wax, forming a hot emulsion thereof in an aqueous liquid containing about two percent of sodium oleate, adding hydrochloric acid to the emulsion, and precipitating the emulsified wax in the form of fine particles by mixing the emulsion with water.

In testimony whereof, I affix my signature.

HAROLD GROSSMAN.